United States Patent [19]

Crute

[11] 4,351,350
[45] Sep. 28, 1982

[54] VALVING ASSEMBLY FOR A LIQUID-CONTAINING TANK

[75] Inventor: Billy G. Crute, Connersville, Ind.

[73] Assignee: Stant Inc., Connersville, Ind.

[21] Appl. No.: 225,848

[22] Filed: Jan. 16, 1981

[51] Int. Cl.³ .............................................. F16K 17/36
[52] U.S. Cl. ...................................... 137/39; 137/43; 220/204
[58] Field of Search ............................. 137/38, 39, 43; 220/203, 204

[56] References Cited

U.S. PATENT DOCUMENTS

| | | |
|---|---|---|
| 1,637,076 | 7/1927 | Heil et al. |
| 1,724,878 | 8/1929 | Jensen |
| 2,062,218 | 11/1936 | Gielen |
| 3,695,376 | 10/1972 | Fiedler et al. |
| 3,738,384 | 6/1973 | Hall ................... 137/493.9 |
| 3,765,435 | 10/1973 | Schlanzky ............. 137/43 X |
| 3,769,952 | 11/1973 | Fiedler et al. ....... 137/493.8 X |
| 3,910,302 | 10/1975 | Sudhir ................. 137/43 |
| 3,938,692 | 2/1976 | Crute .................. 137/43 X |
| 3,983,894 | 10/1976 | Sheppard ............. 137/116 |
| 3,985,260 | 10/1976 | Evans ................. 137/43 X |
| 4,000,828 | 1/1977 | Crute et al. ......... 137/43 X |
| 4,033,475 | 7/1977 | Evans ................. 137/43 X |
| 4,162,021 | 7/1979 | Crute .................. 137/43 X |

*Primary Examiner*—Robert G. Nilson
*Attorney, Agent, or Firm*—Jenkins, Coffey, Hyland, Badger & Conard

[57] ABSTRACT

A valving assembly for a liquid-containing tank comprises a housing which includes vent and valve passageways extending axially therethrough. A roll-over valve is supported in the vent passageway by a spring which is calibrated normally to open the vent passageway to normalize the pressure inside the tank. Movement of the roll-over valve is assisted by the spring to close the vent passageway and prevent movement of the liquid from the tank when the tank is tilted. An excessive pressure valve is disposed in the valve passageway and urged by a spring normally to close the valve passageway. The spring is calibrated to provide movement of the excessive pressure valve member to open the valve passageway when the vent passageway is closed and superatmospheric pressure within the tank exceeds a predetermined level.

14 Claims, 3 Drawing Figures

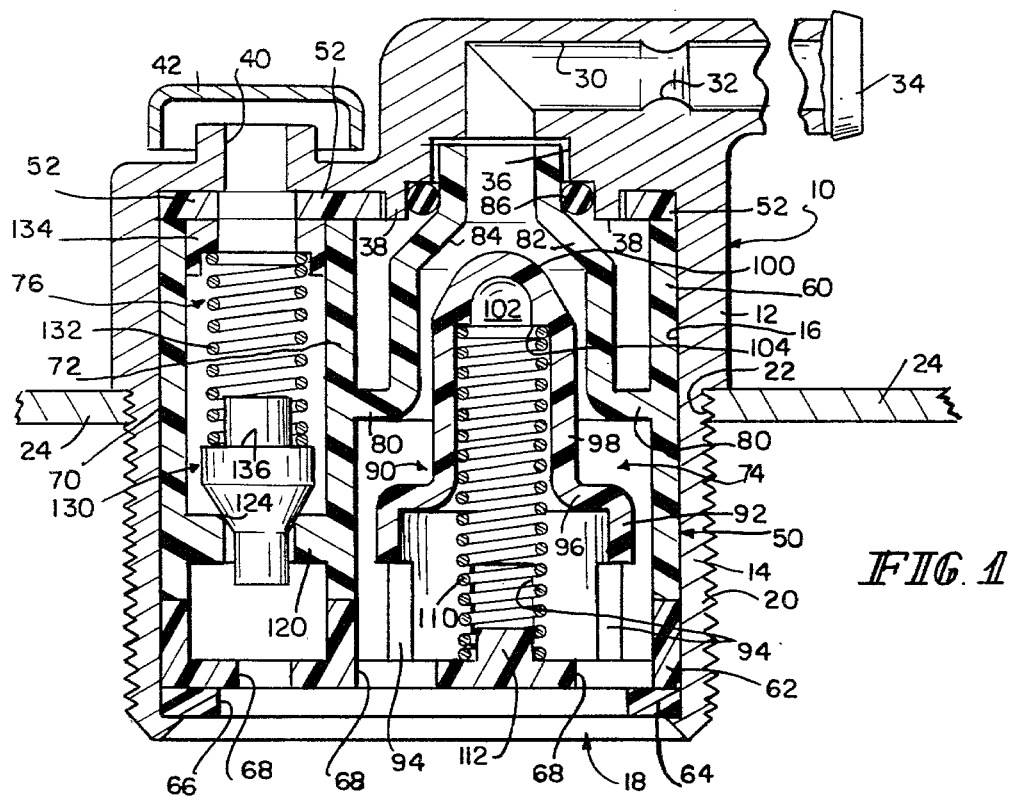
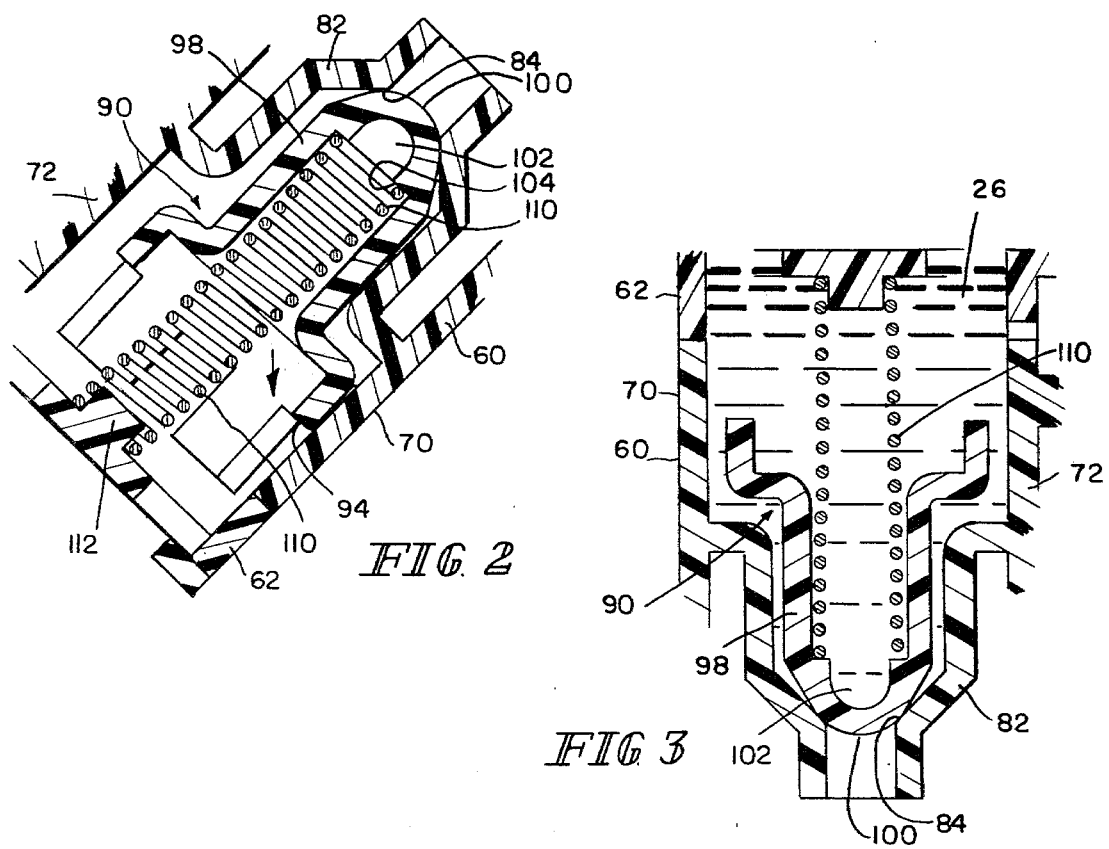

VALVING ASSEMBLY FOR A LIQUID-CONTAINING TANK

The present invention relates to valving assemblies for liquid-containing tanks, including both a vent passageway with a roll-over valve and an excessive pressure valve, and more particularly, to the provision of such an assembly for a vehicle fuel tank.

Many valving assemblies have pressure-vacuum and roll-over valve safety features combined within the same assembly. Many of these prior valving assemblies are either included in caps which close the filler necks of vehicle fuel tanks or are located remote from the filler neck. These prior art valving assemblies generally include a pressure-vacuum valve means for venting the tank when the pressure drops below a predetermined subatmospheric level and when the pressure exceeds a predetermined superatmospheric level. They further include a separate roll-over valve means which is generally included in the same venting passageway as the pressure-vacuum valve means to close the passageway to prevent movement of the liquid from the tank through the passageway when the tank is tilted.

Some of these prior art valving assemblies have also included a third valve means for by-passing the pressure-vacuum valve means and the roll-over valve means when the pressure in the tank exceeds a second and greater predetermined superatmospheric level. Generally, these excessive pressure valve means are included in the same valve passageway as the pressure-vacuum valve means and the roll-over valve means to open the passageway when the passageway is closed by the roll-over valve means and the pressure in the tank reaches a second predetermined superatmospheric pressure level. With three valve means arranged in a single valve passageway, the construction of these prior valving assemblies is relatively complex.

It is therefore one object of the present invention to provide an improved valving assembly having a vent passageway with a roll-over valve and a valve passageway with an excessive pressure valve which is simpler, less expensive, and more efficient than previous valving assemblies.

It is a further object of the present invention to provide a valving assembly having the features described above which advantageously utilizes a calibrated compression spring to assist the movement of a valve means into engagement with a valve seat to close the vent passageway when the tank is tilted.

Another object of the present invention is to provide a valving assembly having the features described above wherein the vent passageway and roll-over valve are distinct and separate from the excessive pressure valve, the excessive pressure valve being disposed in a separate valve passageway.

The improvement according to the present invention comprises a valve housing providing first and second passageways extending axially therethrough in spaced relationship to each other, a first valve member supported within the first passageway by a first spring which is calibrated normally to open the first passageway to normalize pressure inside the tank, and to assist in movement of the first valve member to close the passageway to prevent movement of the liquid from the tank when the tank is tilted. The first passageway and valve member therefore combine both venting and roll-over valve safety features. A second valve member is disposed within the second passageway and urged by a second spring normally to close the second passageway. The second spring is calibrated to provide movement of the second valve member to open the second passageway when the first passageway is closed and superatmospheric pressure within the tank exceeds a predetermined level.

Various other features and advantages of the present invention will become apparent in view of the following detailed description of one embodiment thereof, which description should be considered in conjunction with the accompanying drawings, in which:

FIG. 1 is a sectional view of the valving assembly of the present invention;

FIG. 2 is a fragmentary sectional view of the valving assembly of FIG. 1 slightly tilted to show the roll-over action of one of the valve members; and FIG. 3 is a fragmentary sectional view of the valving assembly of FIG. 1 inverted 180° to further show the roll-over action of one of the valve members.

Referring now to the drawings, the valving assembly includes an outer shell 10 having an axially outer portion 12 and an axially inner portion 14. The shell 10 provides a cavity having an axially extending inner peripheral wall surface 16 and an axially inwardly opening lower end 18. In the illustrative embodiment, shell 10 includes threads 20 for engaging an opening 22 provided in a tank 24. However, the shell 10 may be connected to the tank 24 by other means or techniques such as, for example, flanges and screws or rivets. In the preferred embodiment, shell 10 is constructed of die-cast zinc, although other materials may be used without departing from the scope of the invention.

Formed in the axially outer portion 12 of the shell 10 is a first axially outer vent port 30 which illustratively is elongated and includes a 90° curves section or elbow so that it opens radially outwardly for venting the liquid-containing tank 24. Provided within the first vent port 30 is a restriction 32 for regulating the flow of air and vapor through the vent port 30. Secured to the distal end of the vent port 30 is a nipple connector 34 for connecting the port 30 to a vapor storage canister (not shown). The vapor canister will also be vented for communication with the atmosphere outside the shell 10. Formed within the cavity of the shell 10 adjacent the vent port 30 is an axially inwardly opening recessed area 36 and a downwardly projecting ridge 38 around the periphery of the recessed area 36. The purpose for this recessed area 36 and ridge 38 will be explained later. Also formed in the axially outer portion 12 of the shell 10 separate and distinct from the first vent port 30 is a second axially outer vent port 40 which opens axially outwardly. A cover 42 is secured to the outer surface of the shell 10 is proximity to and in spaced relationship to the second vent port 40 to prevent dust and dirt from entering the second vent port 40. In the preferred embodiment, cover 42 is constructed of zinc-plated steel, although other materials may be used.

A valve housing 50 is held upwardly in the downwardly opening cavity in the shell 10 with its upper peripheral edge engaging a sealing gasket 52 disposed between the housing 50 and the shell 10. The housing 50 includes an upper portion 60 and a lower plate portion 62, each of which, in the preferred embodiment, are constructed of a plastic material. The housing portion 60, 62 are retained within the cavity of the shell 10 by a ring washer 64 having a central opening 66. The lower peripheral edge of the axially inner portion 14 of the shell 10 is staked or curled over the washer 64 to retain the housing portion 60, 62 and other components of the valving assembly in the cavity of the shell 10. The lower plate portion 62 of the valve housing 50 includes a plurality of axially inner vent openings 68 which generally communicate with the central opening 66 of the washer 64. Sealing gasket 52 may be constructed of a resilient material such as, for example, synthetic rubber.

The upper and lower portions 60, 62 of the valve housing 50 form an axially extending radially outer peripheral wall 70 which engages the inner peripheral wall surface 16 of the shell 10, providing frictional contact therebetween. An axially extending, radially inner wall 72 formed by both upper and lower portions 60, 62 of the housing 50 generally divides the housing 50 into a first vent passageway 74 and a second valve passageway 76. Each of the passageways 74, 76 extends axially through the housing 50 in spaced parallel relationship to the other to provide two separate paths of communication, respectively, between the outer vent ports 30, 40, and the inner vent openings 68.

The upper portion 60 of the housing 50 is formed to provide a radially inwardly extending peripheral shoulder 80 and a funnel-shaped member 82 extending axially upwardly therefrom in the first vent passageway 74. The funnel-shaped member 82 has its upper peripheral edge extending into and engaging the recessed area 36 adjacent the first vent port 30. As shown in the figures, the cross-sectional dimension of the first vent passageway is gradually made smaller by the funnel-shaped member 82 so that the upper peripheral edge of the funnel-shaped member 82 has a cross-sectional dimension which is generally equal to the cross-sectional dimension of the first vent port 30. The funnel-shaped member 82 is formed to provide an axially inwardly facing first valve seat 84 which communicates with the first vent port 30 in proximity thereto. An O-ring 86 provides a seal between housing 50 and shell 10 adjacent the ridge 38.

A first valve member 90 is supported within the vent passageway 74 normally to open the vent passageway 74 when the tank 24 is in an upright orientation, as shown in FIG. 1, to normalize the pressure within the tank 24 and to close the vent passageway 74 when the tank is tilted downwardly to a predetermined angle relative to a horizontal plane to prevent movement of the liquid from the tank 24. The first valve member 90 has an axially inwardly opening cup-shaped portion 92 formed at its lower end. The cup-shaped portion 92 has a cross-sectional dimension which is generally less than the cross-sectional dimension of the vent passageway 74, but greater than the cross-sectional dimension of the funnel-shaped member 82. Formed in the cup-shaped portion 92 is a plurality of peripherally spaced-apart, axially extending slots 94. Extending radially inwardly from the cup-shaped portion 92 is a shoulder 96. Extending axially upward from the shoulder 96 is an elongated hollow neck 98 which communicates with the cup-shaped portion 92. At the upper end of the valve member 90 is a conical-shaped head 100 which moves into closing engagement with the first valve seat 84. It should be noted that the cross-sectional dimension of the elongated neck 98 is generally less than the greatest cross-sectional dimension of the funnel-shaped member 82. The head 100 includes an axially inwardly opening curved recess 102 which communicates with the hollow neck 98 and the cup-shaped portion 92 of the valve member 90. Formed around the periphery of the curved recess 102 is an inner ridge 104. In the preferred embodiment, the first valve member 90 is constructed of a plastic material; however, other materials may be used.

The first valve member 90 is supported normally to open the vent passageway 74 by a coiled compression spring 110 which is retained between the inner peripheral ridge 104 of the first valve member 90 and the lower plate portion 62 of the valve housing 50. An axially upwardly projecting protrusion 112 is formed on the lower plate portion 62 for retaining the compression spring 110. The first spring 110 is calibrated so that it will normally support the weight of the valve member 90, giving the valve member 90 a neutral buoyancy similar to a float to assist in closing the vent passageway 74 when the tank 24 is tilted downwardly to a predetermined angle relative to a horizontal plane, as best shown in FIG. 2. In the preferred embodiment, spring 110 has a spring constant sufficient to support the weight of valve member 90. The generally cup-shaped portion 92 and inner hollow features of the valve member 90 allow the liquid 26 to also assist in moving the valve 90 into engagement with the first valve seat 84 when the tank 24 is tilted downwardly. However, the calibration of spring 110 will allow the valve member 90 to be moved into engagement with the valve seat 84 without the presence of the liquid 26, since the downward gravitational force on the valve member 90 is gradually shifted away from the spring 110 as the tank 26 is tilted. This action is best shown in FIG. 2, where the solid arrow represents the direction of the greatest gravitational force on the valve member 90.

Also formed in the upper portion 60 of housing 50 is another radially inwardly extending peripheral shoulder 120 which provides an axially outwardly facing second valve seat 124 in the second valve passageway 76. A second valve member 130, preferably constructed of a synthetic resilient sealing material such as, for example, synthetic rubber, is disposed within the valve passageway 76. The second valve member 130 is yieldably urged against the second valve seat 124 by a second stainless steel compression spring 132 normally to close the passageway 76 against the passage of vapor from the tank 24. The compression spring 132 is captured between a plastic retainer 134 provided around the periphery of the second vent port 40 and a peripheral ridge 136 formed on the second valve member 130. The second spring 132 is calibrated to prevent movement of the second valve member 130 axially outwardly from the second valve seat 124 unless the pressure in the tank 24 exceeds a predetermined superatmospheric level. In the preferred embodiment, spring 132 has a spring constant sufficient to provide an effective seal at the valve seat 124. In the normal upright orientation of the tank 24, the pressure inside the tank 24 is normalized through the normally open vent passageway 74; therefore, a superatmospheric level of pressure within the tank 24 typically occurs only when the first valve member 90 is moved into closing engagement with the first valve seat 84. This condition may exist either when the level of the liquid within the tank 24 rises into the first valve member 90 so that it floats upward into engagement with the first valve seat 84 or when the tank 24 is tilted downwardly to the predetermined angle relative to the horizontal plane. Therefore, the second valve member 130 serves as a backup or excessive pressure valve within the valving assembly. The second spring 132 may, for example, be calibrated to permit excessive pressures greater than 1.5 psi to be released from the tank 24 when the first valve member 90 closes the vent passageway 74.

Referring more particularly to FIGS. 2 and 3, the operation of the valving assembly of the present invention can be described. When the head 100 of the first valve member 90 is in closing engagement with the first valve seat 84, i.e., during a roll-over situation, as shown in FIGS. 2 and 3, the vent passageway 74 through the valve housing 50 is closed. When the vent passageway 74 is closed, the second valve member 130 and the valve passageway 76 operate separately from the first valve member 90 to release excessive pressure from within the tank 24. Accordingly, during a roll-over situation or at any other time when the vent passageway 74 is closed, excessive pressure develops in the tank 24 and the valving assembly will vent such excessive pressure through the valve passageway 76. In the normal upright orientation of the valve assembly and tank 24, the vent passageway 74 is normally open to allow the normalization of pressure within the tank 24. Venting of vapor from within the tank 24 occurs through the vapor storage canister (not shown) connected to the first vent port 30.

Referring particularly to FIG. 2, spring 110 will urge the first valve member 90 to close against the seat 84 when the tank 24 is tilted more than, for instance, an angle of about 30° to 45° from a horizontal plane. When the tank 24 is in an upright orientation, generally all of the gravitational force on the valve 90 is directed along the axis of the spring 110. In this position, spring 110 is calibrated to support valve 90. When the tank 24 is tilted, only a component of the total gravitational force on the valve 90 is directed along the axis of the spring 110. At the predetermined angle, the gravitational force component on the spring 110 is generally less than the compression force of the spring 110, and spring 110 expands to close valve 90 against seat 84. As liquid 26 enters the cup-shaped portion 92 of the valve 90, the weight of the liquid 26 provides further assistance for urging the valve 90 into engagement with the valve seat 84. The assistance of the calibrated spring 110, combined with the weight of the liquid 26, allows the valving assembly of the present invention to respond more efficiently to the tilting of the tank 24 than previous valving assemblies to prevent movement of the liquid 26 from the tank 24.

Referring particularly to FIG. 3, it can further be appreciated that when the tank 24 is inverted 180°, at least three forces operate on the first valve member 90 to assure that it remains engaged with the first valve seat 84. These forces are the gravitational force on the valve member 90 itself, the force associated with the expansion of spring 110, and the weight of the liquid 26 contained within the hollow valve member 90.

In one illustrative embodiment, housing 50 has an overall cross-sectional dimension of 1.56 inches (39.62 mm). Vent passageway 74 has a cross-sectional dimension of 0.66 inch (16.76 mm) and valve passageway 76 has a cross-sectional dimension of 0.31 inch (7.87 mm). The funnel-shaped member 82 forming the first valve seat 84 has a larger cross-sectional dimension of 0.18 inch (4.57 mm) and a smaller cross-sectional dimension of 0.15 inch (3.81 mm), which corresponds generally to the cross-sectional dimension of the first vent port 30. The second vent port 40 has a cross-sectional dimension of 0.14 inch (3.55 mm). First valve member 90 is generally 0.905 inch (22.99 mm) in length. The cup-shaped portion and neck 98 of valve 90 are generally 0.500 inch (12.70 mm) and 0.31 inch (7.87 mm) in cross-section, respectively. Shell 10 is generally 1.375 inches (34.92 mm) in cross section and 0.500 inch (12.70 mm) in axial height.

What is claimed is:

1. A valving assembly for a liquid-containing tank, comprising a housing generally divided into first and second axially extending passageways providing separate paths of communication between the inside and outside of the tank, the housing being formed to provide a first inwardly facing valve seat in the first passageway and a second axially outwardly facing valve seat in the second passageway, a first valve member positioned in the first passageway, a first spring for supporting the first valve member out of engagement with the first valve seat normally to open the first passageways when the tank is in an upright orientation, the first spring being calibrated to urge the first valve member into engagement with the first valve seat to close the first passageway when the tank is tilted downwardly to a predetermined angle relative to a horizontal plane, a second valve member positioned in the second passageway, and a second spring for yieldably urging the second valve member into engagement with the second valve seat normally to close the second passageway, the second spring being calibrated to provide movement of the second valve means out of engagement with the second valve seat when the pressure in the tank exceeds a predetermined superatmospheric level.

2. The apparatus as recited in claim 1 wherein the first and second passageways extend in spaced parallel relationship to each other through the housing.

3. The apparaus as recited in claim 2 wherein the housing further includes a plurality of axially inner vent ports communicating with the passageways.

4. The apparatus as recited in claim 3, further comprising an outer shell having first and second outer vent ports, the housing being retained within the outer shell, the first and second passageways communicating, respectively, with the first and second outer vent ports to provide two separate paths of communication between the inside and outside of the tank.

5. The apparatus as recited in claim 4, further comprising means for connecting the outer shell to an opening provided in the tank.

6. The apparaus as recited in claim 1 wherein the housing includes an axially extending, radially outer wall and at least one axially extending radially inner wall dividing the housing into the first and second passageways.

7. The apparatus as recited in claim 6 wherein the housing is formed to provide a radially inwardly extending shoulder and a funnel-shaped member extending axially upward therefrom in the first passageway, the funnel-shaped member providing the first inwardly facing valve seat and a first axially outwardly opening vent port.

8. The apparatus as recited in claim 7 wherein the first valve member is generally funnel-shaped and opens axially inwardly, the cross-sectional dimensions of the first valve member being generally less than the cross-sectional dimensions of the first passageway and the funnel-shaped member of the housing.

9. The apparatus as recited in claim 8 wherein the first valve member includes an axially inwardly opening cup-shaped portion, a shoulder extending radially inwardly therefrom, an elongated neck extending axially upwardly from the shoulder, and a conical-shaped head for engaging the first valve seat.

10. The apparatus as recited in claim 9 wherein the first spring is retained between the first valve member and a lower portion of the housing normally to support the first valve member out of engagement with the first valve seat.

11. The apparatus as recited in claim 9 wherein the cup-shaped portion of the first valve includes a plurality of peripherally spaced-apart, axially extending slots.

12. The apparatus as recited in claim 9 wherein the housing is further formed to provide a second axially outwardly opening vent port and a radially inwardly extending shoulder in the second valve passageway, the shoulder providing the second axially outwardly facing valve seat.

13. The apparatus as recited in claim 12 wherein the second spring is retained between the second valve member and an upper portion of the housing normally to yieldably urge the second valve member into engagement with the second valve seat.

14. A valving assembly for a liquid-containing tank, comprising a housing providing vent and valve passageways extending axially therethrough in spaced parallel relationship to each other, means for connecting the housing to the tank, the housing being formed to provide a first axially inwardly facing valve seat in the vent passageway, and a second axially outwardly facing valve seat in the valve passageway, a first valve member positioned in the vent passageway to move axially outwardly into closing engagement with the first valve seat when the tank is tilted, first spring means for urging the first valve member axially toward the first valve seat, the first spring means being calibrated normally to support the first valve member out of engagement with the first valve seat and open the vent passageway when the tank is in an upright orientation to vent vapors from the tank and to assist in moving the first valve member into engagement with the first valve seat when the tank is tilted downwardly to a predetermined angle, a second valve member positioned in the valve passageway to move axially outwardly out of engagement with the second valve seat when superatmospheric pressure in the tank exceeds a predetermined level, and a second spring for yieldably urging the second valve member axially inwardly against the second valve seat normally to close the valve passageway, the second spring means being calibrated to provide movement of the second valve member axially outwardly away from the second valve seat when the superatmospheric pressure in the tank exceeds the predetermined level.

* * * * *